United States Patent
Hsieh et al.

(10) Patent No.: US 7,743,122 B1
(45) Date of Patent: Jun. 22, 2010

(54) METHOD OF RELIABLY COMMUNICATING VIA COMPUTER NETWORK

(75) Inventors: Jonathan M. Hsieh, Seattle, WA (US); Thomas Lotze, College Park, MD (US)

(73) Assignee: The United States of America as represented by the Director of the National Security Agency, Washington, DC (US)

( * ) Notice: Subject to any disclaimer, the term of this patent is extended or adjusted under 35 U.S.C. 154(b) by 358 days.

(21) Appl. No.: 11/998,984

(22) Filed: Nov. 7, 2007

(51) Int. Cl.
*G06F 15/16* (2006.01)

(52) U.S. Cl. .................. 709/221; 709/223; 709/239; 370/217; 370/221

(58) Field of Classification Search .............. 709/221, 709/223, 226, 238–239; 370/217, 221
See application file for complete search history.

(56) References Cited

U.S. PATENT DOCUMENTS

| | | | |
|---|---|---|---|
| 5,802,286 A * | 9/1998 | Dere et al. ............ 709/220 |
| 6,067,093 A * | 5/2000 | Grau et al. ............ 345/440 |
| 6,411,946 B1 | 6/2002 | Chaudhuri | |
| 7,054,934 B2 | 5/2006 | Graupner et al. | |
| 7,075,892 B2 | 7/2006 | Grover et al. | |
| 7,092,378 B1 | 8/2006 | O'Neil | |
| 7,117,273 B1 * | 10/2006 | O'Toole et al. ............ 709/252 |
| 7,162,260 B2 * | 1/2007 | Shoji et al. ............ 455/507 |
| 2002/0026342 A1 | 2/2002 | Lane et al. | |
| 2005/0044211 A1 * | 2/2005 | Adhikari ............ 709/224 |

\* cited by examiner

*Primary Examiner*—David Lazaro
(74) *Attorney, Agent, or Firm*—Robert D. Morelli

(57) ABSTRACT

A method of reliably communicating via a computer network by identifying hub nodes in the network, identifying leaf nodes in the network, communicating from hub nodes to corresponding leaf nodes, reporting from leaf nodes to corresponding hub nodes, communicating between hub nodes, re-designating a leaf node as a hub node if the leaf node identifies a region of the network not known by a hub node, re-designating a hub node as a leaf node if the hub node becomes redundant, re-designating a leaf node as a hub node if the leaf node loses connectivity to its hub node, and returning to the third step for additional processing.

16 Claims, 1 Drawing Sheet

METHOD OF RELIABLY COMMUNICATING VIA COMPUTER NETWORK

FIELD OF INVENTION

The present invention relates, in general, to electrical computers and digital processing systems and, in particular, to multi-computer data transfer.

BACKGROUND OF THE INVENTION

Computers are increasingly being relied upon as the preferred method of communication. Therefore, it is becoming increasingly important that computer communication be reliable. Interruptions in data delivery, due to the lack of availability or bandwidth in a channel, can seriously impact communications. Therefore, there is a need for a method of efficiently routing computer communications.

U.S. Pat. No. 6,411,946, entitled "ROUTE OPTIMIZATION AND TRAFFIC MANAGEMENT IN AN ATM NETWORK USING NEURAL COMPUTING," discloses a method of optimizing routing selection and managing traffic by monitoring link data traffic, obtaining traffic history data, training an autoregressive backpropagation neural network, obtaining predicted traffic profiles, selecting predicted traffic links, and using quality-of-service factors to select an optimal route. The present invention does not monitor link data traffic; obtain traffic history data, train an autoregressive backpropagation neural network, obtain predicted traffic profiles, select predicted traffic links, and use quality-of-service factors to select an optimal route as does U.S. Pat. No. 6,411,946. U.S. Pat. No. 6,411,946 is hereby incorporated by reference into the specification of the present invention.

U.S. Pat. No. 7,054,934, entitled "TAILORABLE OPTIMIZATION USING MODEL DESCRIPTIONS OF SERVICES AND SERVERS IN A COMPUTING ENVIRONMENT," discloses a device for and method of optimizing the allocation of computer resources between server and service models by allowing a user to select one of a plurality of optimization methods then employing the selected method to generate an optimal mapping of the server and service models. The present invention does not allow a user to select one of a plurality of optimization methods and employ the selected method to generate an optimal mapping of server and service models as does U.S. Pat. No. 7,054,934. U.S. Pat. No. 7,054,934 is hereby incorporated by reference into the specification of the present invention.

U.S. Pat. No. 7,075,892, entitled "TOPOLOGICAL DESIGN OF SURVIVABLE MESH-BASED TRANSPORT NETWORKS," discloses a method of designing a telecommunication network by finding an initial topology of spans between nodes, minimizing the cost of these spans, finding additional spans that ensure restorability, minimizing the cost of the additional spans, and finding a final topology. The present invention does not find additional spans that ensure restorability as does U.S. Pat. No. 7,075,892. U.S. Pat. No. 7,075,892 is hereby incorporated by reference into the specification of the present invention.

U.S. Pat. No. 7,092,378, entitled "SYSTEM FOR UTILIZING A GENETIC ALGORITHM TO PROVIDE CONSTRAINT-BASED ROUTING OF PACKETS IN A COMMUNICATION NETWORK," discloses a device for and method of using a genetic algorithm to assign flows to paths. The present invention discloses more than does U.S. Pat. No. 7,092,378. U.S. Pat. No. 7,092,378 is hereby incorporated by reference into the specification of the present invention.

U.S. Pat. Appl. No. 20020026342, entitled "MULTI-LAYER ENGINE USING GENERIC CONTROLS FOR OPTIMAL ROUTING SCHEME," discloses a device for and method of generating an optimal allocation schedule by using a generic multi-layering scheduling mechanism employing a heuristic algorithm. The present invention discloses more than does U.S. Pat. Appl. No. 20020026342. U.S. Pat. Appl. No. 20020026342 is hereby incorporated by reference into the specification of the present invention.

SUMMARY OF THE INVENTION

It is an object of the present invention to make network communications more reliable.

It is another object of the present invention to make network communications more reliable by adaptively constraining the routing of communications within a network.

The present invention is a method reliably communicating via a computer network.

The first step of the method is identifying hub nodes in the network.

The second step of the method is identifying leaf nodes in the network.

The third step of the method is communicating from hub nodes to corresponding leaf nodes.

The fourth step of the method is reporting from leaf nodes to corresponding hub nodes.

The fifth step of the method is communicating between hub nodes.

The sixth step of the method is re-designating a leaf node as a hub node if the leaf node identifies a region of the network not known by a hub node.

The seventh step of the method is re-designating a hub node as a leaf node if the hub node becomes redundant.

The eighth step of the method is re-designating a leaf node as a hub node if the leaf node loses connectivity to its hub node.

The ninth step of the method is returning to the third step for additional processing.

DETAILED DESCRIPTION

Figure 1:
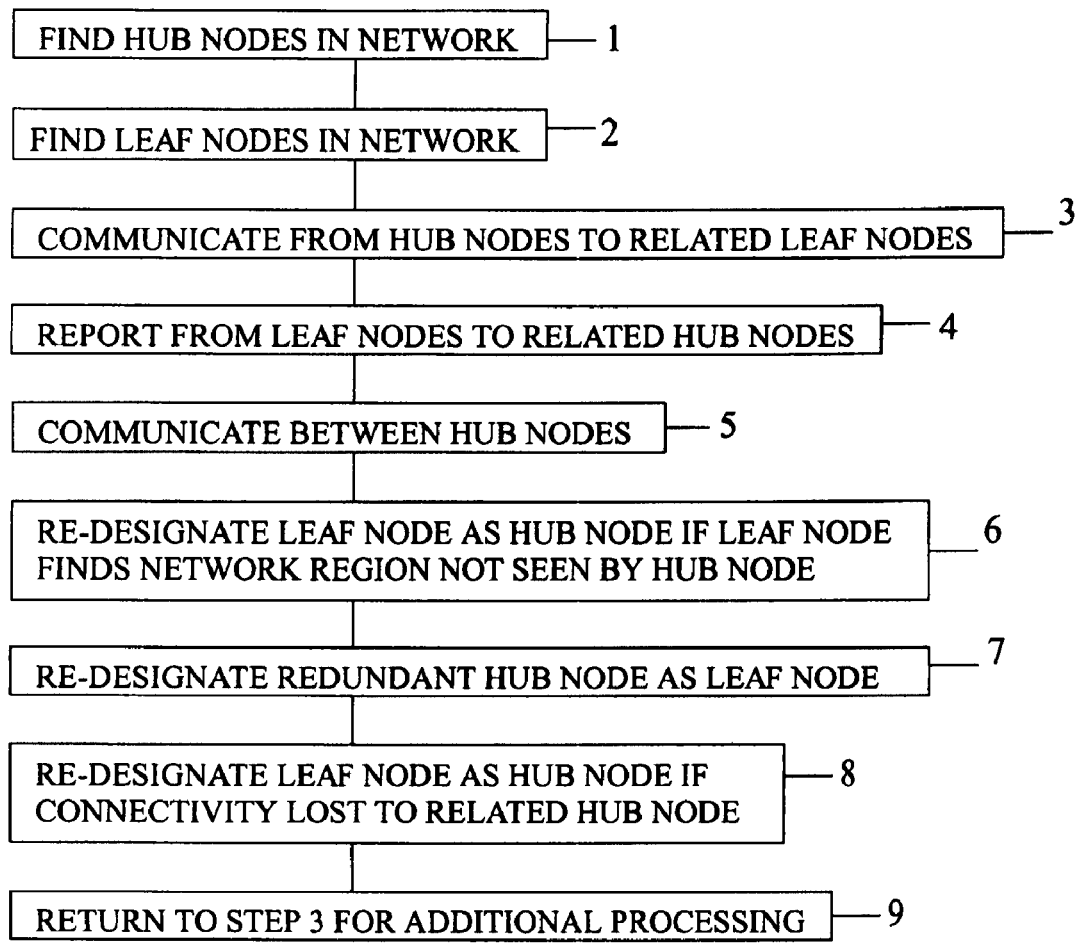
FIG. 1 is a flowchart of the present invention.

The present invention is a method of reliably communicating via a computer network.

FIG. 1 is a flowchart of the present invention.

The first step 1 of the method is identifying hub nodes in an electronic network (e.g., computer, personal digital device, cell phone, etc.). In the preferred embodiment, hub nodes are identified using prior art methods such as traffic engineering, genetic algorithms, and ad-hoc assignment methods.

The second step 2 of the method is identifying leaf nodes in the network. Leaf nodes are nodes in the network that do not add any additional visibility to network nodes above that already visible to hub nodes. In the preferred embodiment, leaf nodes are identified in the same manner as are the hub nodes.

The third step 3 of the method is communicating from hub nodes to corresponding leaf nodes. The communication is via any suitable communication method (e.g., Internet protocol communication, Asynchronous Transfer Mode). The communication may be with all nodes at the same time, with the nodes in a user-definable order, with a user-definable subset of nodes at the same time, with the nodes at a user-definable time, randomly, farthest node first, closest node first, most frequently communicated node, or least frequently communicated node first. Hub nodes collect information from corresponding leaf nodes and communicate information to corresponding leaf nodes.

The fourth step 4 of the method is reporting from leaf nodes to corresponding hub nodes. Leaf nodes report on nodes they know exist and provide status on themselves. Leaf nodes identify neighboring nodes by broadcasting a message, sending a wireless signal, and any other suitable node identification method.

The fifth step 5 of the method is communicating between hub nodes. Hub nodes communicate between themselves in the same manner as hub nodes communicate with leaf nodes.

The sixth step 6 of the method is re-designating a leaf node as a hub node if the leaf node identifies a region of the network not known by, or visible to, a hub node. For increased redundancy or efficiency, a leaf node may be re-designating as a hub node based on node statistics such as the number of its neighboring nodes, the amount of time it is operating (i.e., uptime), the number of its neighboring nodes plus the amount of its uptime, and the processor speed of the node.

The seventh step 7 of the method is re-designating a hub node as a leaf node if the hub node becomes redundant. A hub node is redundant when all of the nodes it knows exist are also known to exist by another hub node.

The eighth step 8 of the method is re-designating a leaf node as a hub node if the leaf node loses connectivity to its hub node.

The ninth step 9 of the method is returning to the third step 3 for additional processing.

What is claimed is:

1. A method of reliably communicating via a computer network, comprising the steps of:
    a) identifying hub nodes in the network;
    b) identifying leaf nodes in the network;
    c) communicating from hub nodes to corresponding leaf nodes;
    d) reporting from leaf nodes to corresponding hub nodes;
    e) communicating between hub nodes;
    f) if leaf node identifies a region of the network not known by a hub node then re-designating leaf node as a hub node;
    g) if a hub node becomes redundant then re-designating hub node as a leaf node;
    h) if leaf node loses connectivity to its hub node then re-designating the leaf node as a hub node; and
    i) returning to step (c) for additional processing.

2. The method of claim 1, wherein the step of identifying hub nodes in network is comprised of the step of using a hub identifying method selected from the list of hub identification methods consisting of traffic engineering methods, genetic algorithm methods, and assigning methods.

3. The method of claim 2, wherein the step of identifying leaf nodes in network is comprised of the step of using a leaf identifying method selected from the list of leaf identification methods consisting of traffic engineering methods, genetic algorithm methods, and assigning methods.

4. The method of claim 3, wherein each communicating step is comprised of the step of using network communication methods selected from the group of network communication methods consisting of Internet protocol communication methods, Asynchronous Transfer Mode, and any other suitable network communication method.

5. The method of claim 4, wherein each communicating step is comprised of the step of communicating using a communication method selected from the group of communication methods consisting of communicate with all nodes at the same time, communicate with the nodes in a user-definable order, communicate with a user-definable subset of nodes at the same time, communicate with the nodes at a user-definable time, randomly, farthest node first, closest node first, most frequently communicated node, and least frequently communicated node first.

6. The method of claim 5, wherein each step of communicating from hub nodes to corresponding leaf nodes is comprised of the steps of:
    (a) collecting information from corresponding leaf nodes; and
    (b) communicating information collected by hub nodes with their corresponding leaf nodes.

7. The method of claim 6, wherein each step of reporting from leaf nodes to corresponding hub nodes is comprised of the steps of:
    (a) reporting on nodes that it knows exist using node identification methods selected from the group of node identification methods consisting of broadcasting a message, sending a wireless signal, and any other suitable node identification method; and
    (b) providing status.

8. The method of claim 7, wherein each step of re-designating leaf node as a hub node is comprised of the step of re-designating leaf node as a hub node based on node statistics selected from the group of node statistics consisting of number of neighboring nodes, amount of node uptime, number of neighboring nodes plus amount of node uptime, and node processor speed.

9. The method of claim 8, wherein the step of re-designating hub node as a leaf node is comprised of the step of re-designating hub node as a leaf node if all of the nodes the hub node knows exist are know to exist by another hub node.

10. The method of claim 1, wherein the step of identifying leaf nodes in network is comprised of the step of using a leaf identifying method selected from the list of leaf identification methods consisting of traffic engineering methods, genetic algorithm methods, and assigning methods.

11. The method of claim 1, wherein each communicating step is comprised of the step of using network communication methods selected from the group of network communication methods consisting of Internet protocol communication methods, Asynchronous Transfer Mode, and any other suitable network communication method.

12. The method of claim 1, wherein each communicating step is comprised of the step of communicating using a communication method selected from the group of communication methods consisting of communicate with all nodes at the same time, communicate with the nodes in a user-definable order, communicate with a user-definable subset of nodes at the same time, communicate with the nodes at a user-definable time, randomly, farthest node first, closest node first, most frequently communicated node, and least frequently communicated node first.

13. The method of claim 1, wherein each step of communicating from hub nodes to corresponding leaf nodes is comprised of the steps of:
    (a) collecting information from corresponding leaf nodes; and
    (b) communicating information collected by hub nodes with their corresponding leaf nodes.

14. The method of claim 1, wherein each step of reporting from leaf nodes to corresponding hub nodes is comprised of the steps of
    (a) reporting on nodes that it knows exist using node identification methods selected from the group of node identification methods consisting of broadcasting a message, sending a wireless signal, and any other suitable node identification method; and (b) providing status.

15. The method of claim 1, wherein each step of re-designating leaf node as a hub node is comprised of the step of re-designating leaf node as a hub node based on node statistics selected from the group of node statistics consisting of number of neighboring nodes, amount of node uptime, number of neighboring nodes plus amount of node uptime, and node processor speed.

16. The method of claim 1, wherein the step of re-designating hub node as a leaf node is comprised of the step of re-designating hub node as a leaf node if all of the nodes the hub node knows exist are know to exist by another hub node.

* * * * *